Patented Nov. 18, 1924.

1,515,908

UNITED STATES PATENT OFFICE.

CHARLES H. STEPHENSON, OF WASHINGTON, DISTRICT OF COLUMBIA, DEDICATED, BY MESNE ASSIGNMENTS, TO THE CITIZENS OF THE UNITED STATES.

PROCESS FOR THE REMOVAL OF MAGGOTS, INSECTS, GREEN BERRIES, TRASH, AND SIMILAR OBJECTS FROM BLUEBERRIES.

No Drawing. Application filed September 17, 1924. Serial No. 738,314.

(FILED UNDER THE ACT OF MARCH 3, 1883, 22 STAT. L., 625.)

*To all whom it may concern:*

Be it known that I, CHARLES H. STEPHENSON, a citizen of the United States of America, and an employee of the United States Department of Agriculture, residing at Washington, District of Columbia, have invented a new and useful Process for the removal of maggots, insects, green berries, trash, and similar objects from blueberries, of which the following is a specification.

This application is made under the act of March 3, 1883, chapter 143 (22 Stat. 625) and the invention herein described and claimed may be used by the Government of the United States or any of its officers or employees in the prosecution of work for the Government, or any person in the United States, without payment to me of any royalty thereon.

The object of my invention is to remove by skimming the green and immature blueberries, bunches of berries, insects, and trash of such kinds as will float and thus eliminate hand-picking of blueberries. A further object is to remove maggots from blueberries through the application of heated water.

In carrying out my invention, I employ a tank which may be of any convenient size and of any number of compartments desired and may be constructed of any suitable material. The tank is preferably equipped with water-pipe and steam-pipe connections and with a valve at the bottom thereof for drainage purposes. The valve opening must be large enough to permit of quickly draining the tank and so placed as to permit complete drainage of the tank. The tank is provided with a false bottom so constructed as to be quickly and easily removed. The false bottom is preferably made of wire four to six meshes to the inch. The tank is filled about two-thirds full of water which is heated by means of steam pipe to between 125 and 130 degrees F.

The blueberries are slowly dumped into this tank sufficient in amount to bring the surface of the water no higher than at the most two inches from the top of the tank. Less may be used if desired. These berries are slowly stirred and left in the water for a period of approximately fifteen minutes. The surface may be skimmed off with any suitable instrument to remove green berries, bunch berries and any trash, etc., floating at surface. The berries are slowly dipped out from this tank after the required time has elapsed, by means of a dip net of suitable size and of from 4 to 6 meshes to the inch.

I have found that maggots may be separated from blueberries through the application of water thereto, the water having been previously warmed to between 110 to 140 degrees F. and the blueberries kept in said heated water for a length of time of five minutes or more. This causes a large number of the maggots to come out of the berries. The maggots thus released and which settle to the bottom of the tank by means of a suitable screen through which they are separated from the berries, may be removed.

When the blueberries are kept in the heated water for a period of fifteen minutes or more, separation from the blueberries of dirt, dust, green and immature berries, bunches of berries, insects and trash of such kinds as will float, may be obtained from the surface of the water, by skimming.

The bath may be applied (1) in open tank into which the berries are dumped and slowly stirred by suitable device, the tank to be furnished with a suitable false bottom to allow the maggots to settle there, or (2) in a tank through which the berries are carried on a slowly moving conveyor timed to give the required immersion, or (3) in a slowly revolving horizontal drum covered with a screen of such mesh as to allow the released maggots to pass through while the berries are retained on the inside, said drum to revolve partially submerged in a tank of water.

I claim:

1. A process for the separation from blueberries of dirt, dust, immature berries, insects and trash of such kinds as will float, consisting in subjecting blueberries to a water bath, the temperature of the water being maintained at approximately 125 degrees F. for a period of approximately fifteen minutes.

2. A process for the separation from blueberries of maggots and worms consisting in subjecting the blueberries to a water bath at a temperature between 110 and 140 degrees F. for a period of approximately five minutes.

CHARLES H. STEPHENSON.